United States Patent [19]
Martin

[11] 3,750,603
[45] Aug. 7, 1973

[54] APPARATUS FOR CONTROLLING A SEWING MACHINE THREAD CUTTER

[75] Inventor: Robert A. Martin, Whitman, Mass.

[73] Assignee: Clevepak Corporation, New York, N.Y.

[22] Filed: Apr. 5, 1971

[21] Appl. No.: 131,294

Related U.S. Application Data

[63] Continuation-in-part of Ser. No. 26,499, April 8, 1970, abandoned.

[52] U.S. Cl............ 112/252, 112/130, 112/121.11, 235/92 PE, 235/132 E, 328/48, 328/72, 112/203
[51] Int. Cl............................................. D05b 65/02
[58] Field of Search................ 112/252, 130, 203, 112/121.11; 235/92 PE, 132 E; 328/48, 72; 307/225; 318/267, 467, 696; 83/354, 362, 363, 365, 370

[56] References Cited
UNITED STATES PATENTS

| | | | |
|---|---|---|---|
| 3,074,632 | 1/1963 | Braun et al. | 235/92 PE |
| 2,685,664 | 8/1954 | Visconti | 112/130 X |
| 2,705,466 | 4/1955 | Sargrove et al. | 112/130 X |
| 2,906,217 | 9/1959 | Myska | 112/121.11 X |
| 2,970,763 | 2/1961 | Freeman | 328/48 X |
| 3,024,750 | 3/1962 | Winz | 112/203 |
| 3,025,444 | 3/1962 | Myska | 318/467 X |
| 3,418,954 | 12/1968 | Svendsen et al. | 112/252 |
| 3,557,728 | 1/1971 | Duke | 112/121.14 |
| 3,654,882 | 4/1972 | Kamena | 318/696 X |
| 3,682,131 | 8/1972 | Algeri et al. | 328/72 X |

*Primary Examiner*—James R. Boler
*Attorney*—Cushman, Darby & Cushman

[57] ABSTRACT

An apparatus and method for controlling sewing machine operations and a counting combination whereby a sequence of pulses having a frequency which is a function of machine speed is produced and counted by a counter. Upon a first count, the counter produces a first operation, such as cutting, reversing the machine, changing machine speed, etc., to take place and upon a second count the counter produces a second signal which causes a second operation to take place. In one embodiment the counter operates a counter after a predetermined amount of material or thread has been advanced before the cutter and again after a predetermined number of stitches have been taken after the material has passed the needle. The counting combination includes first and second switches connected to the output of digital counting circuitry for manually selecting the first and second counts and logic circuitry linking the switches to a flip-flop for providing signals at the two counts.

8 Claims, 3 Drawing Figures

APPARATUS FOR CONTROLLING A SEWING MACHINE THREAD CUTTER

This is a continuation-in-part of an application of the same title, Ser. No. 26,499, filed Apr. 8, 1970 now abandoned.

BRIEF DESCRIPTION OF THE PRIOR ART AND SUMMARY OF THE INVENTION

This invention relates to a method and apparatus for controlling a sewing machine operation and to a counting combination.

It has heretofore been recognized as advantageous to automatically perform as many sewing operations on a sewing machine, particularly one producing commercially, as possible. Many such operations exist and one is automatically cutting the thread left by a sewing machine between successive articles, rather than requiring the operator to perform this operation manually. However, as it is typically impractical to locate the thread cutter closely adjacent the sewing machine needle, some delay must be introduced between the passage of an edge of a piece of material being sewn and the operation of the cutter.

In U.S. Pat. No. 3,418,954, there is disclosed thread-cutting apparatus which provides a predetermined time delay between the passage of an edge of a piece of material and the operation of the cutter. However, the use of an essentially fixed time delay means that the speed of operation of the sewing machine must be held within relatively tightly controlled limits, if the thread is to be cut closely adjacent the edge of the material. Further, this prior art apparatus provides only a single delay. Since the paying out of thread from the sewing machine between successive articles typically occurs at a faster linear rate than the feeding of material through the sewing machine, it can be seen that the delay needed is not the same for the leading and trailing edges of a given piece of material.

Among the several objects of the present invention may be noted the provision of apparatus for controlling a sewing machine device such as thread cutter to provide a cutting operation closely adjacent the edge of a piece of material being sewn; the provision of such apparatus which will provide precise operation over a wide speed range; the provision of such apparatus which will provide accurate operation relative to either the leading edge or the trailing edge of a piece of material; the provision of such apparatus which is highly reliable and which is relatively simple and inexpensive.

A further problem is the unavailability hitherto of a suitable counting apparatus for providing signals indicating when an operation such as counting should take place. Yet another object of this invention is a simple, inexpensive and practical counting combination which provides a first output upon a first count and a second output upon a second count.

Other objects and features will be in part apparent and in part pointed out hereinafter.

Briefly, apparatus according to the present invention is adapted to operate a sewing machine device such as a thread cutter which is associated with a sewing machine and which is located a predetermined distance from the point of operation of the sewing machine needle. A signal generating means, such as a switch, operates in synchronism with the sewing machine and provides an impulse signal having a frequency which is proportional to the speed of operation of the machine. A digital counter counts these impulses.

The digital counter has a multiplicity of distinct states which occur sequentially and incorporates read-out means providing signals indentifying the existing state of the counter. A sensing means, such as a second switch located adjacent to the sewing machine needle, provides a signal when the edge of a piece of material being sewn passes the point of needle operation. This signal is applied to the counter for setting it to a predetermined state. A presettable control switch, having a multiplicity of states corresponding to the possible states of the counter, is interconnected with the counter to provide an output signal when coincidence occurs between the state of the counter and the preset state of the switch. The cutter is then actuated in response to this output signal.

The apparatus can also be employed to control other sewing machine operations and is not limited to cutting thread. For example, upon a first count the machine can be precisely reversed to add reinforcing stitches, thus eliminating the problem of over-travel in the forward direction. At a second count the machine can then be stopped. Alternatively at alternate counts, the machine can be shifted from a first to second speed and vice versa to bunch up and then spread out stitches automatically. Many other such operations can be controlled in this fashion.

The counting combination preferably includes a binary coded digital counter and decoder which provides a plurality of output lines each representing a digit. First and second manual switches can be connected to any one of these lines so that a signal is provided on the line connected to each switch upon the first and second chosen counts respectively. Two AND gates each have their inputs connected to the first and second switches respectively and to one of the two outputs of a conventional flip-flop for changing its output upon the first and second counts. The AND gates thus provide signals upon the two counts which can be used to control a cutter or other sewing device.

BRIEF DESCRIPTION OF THE DRAWINGS

Corresponding reference characters indicate corresponding parts throughout the several views of the drawings.

DETAILED DESCRIPTION OF THE DRAWINGS

Figure 1:
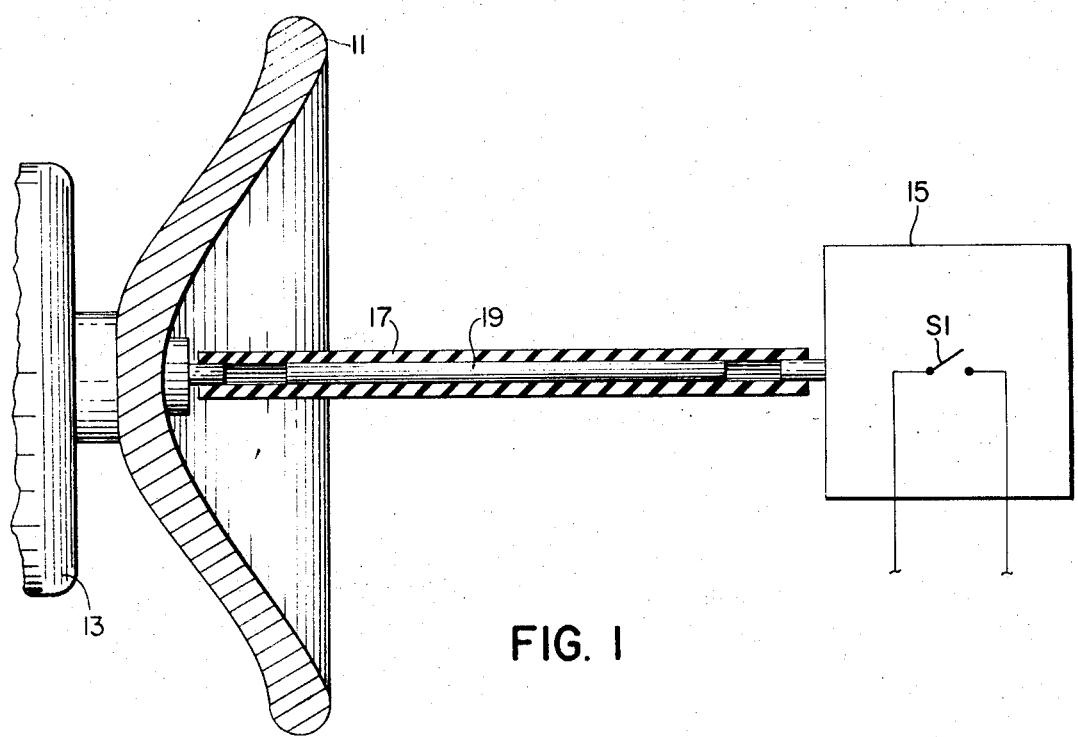
FIG. 1 is a side view, with parts broken away, of a tachometer generator which operates in association with the handwheel of a sewing machine for providing a speed or event signal employed by the control apparatus of the present invention.

Referring now to FIG. 1, there is indicated at 11 the handwheel of a conventional sewing machine. The sewing machine itself is designated generally as 13. A tachometer generator 15 is coupled to the hub of the handwheel 11 by means of a short length of flexible tubing 17 which accommodates any misalignment between the handwheel and the shaft of the tachometer generator 15. The central section of tube 17 is preferably stiffened by means of a rigid rod 19 which prevents drooping of the tubing. An appropriate type of tachometer generator for use with the present apparatus is one in which a toothed magnetic rotor operates a magnetically responsive reed switch, the switch being closed one or more times each time the rotor revolves. In FIG. 1 such a switch is indicated at S1. Tachometer generators of this type are available commercially. As the tachometer 15 is driven in synchronism with the operation of the sewing machine, by means of the flexible coupling, it can be seen that the repetitive closing of switch S1 provides an impulse signal having a frequency which is proportional to the speed of operation of the sewing machine. As will be understood, other means for generating such a signal may be used, such as an optical chopping disc with a light source and photocell.

Figure 2:
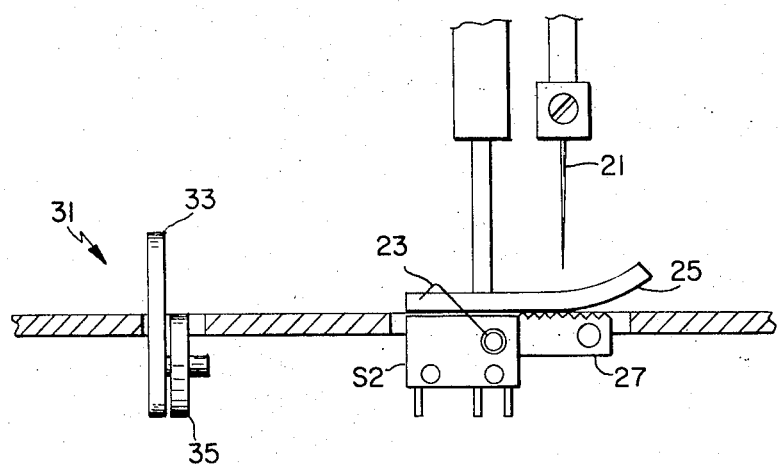
FIG. 2 is a side view, with parts broken away, of a switch mounted adjacent the presser foot of a conventional sewing machine for generating a second signal employed in the operation of apparatus of this invention.

With reference to FIG. 2, the sewing machine 13 is preferably also provided with a second switch S2 which is mounted adjacent the point of operation of the sewing machine needle, the needle being indicated at 21. Switch S2 preferably has a relatively low actuating force and incorporates an actuating arm 22 which is positioned so as to detect the presence of a piece of material between the sewing machine presser foot, designated 25, and the feed shoe 27 which cooperates with the presser foot to feed material through the machine. Switches of this type are commonly referred to as being of the microswitch variety. The operation of switch S2 provides a signal indicating the passage of the edge of a piece of material past the needle 21, the closing of the switch being indicative of the leading edge and the opening of the switch being indicative of the trailing edge. Similarly, a photocell might also be utilized to provide this sensing function.

A thread cutter is indicated generally at 31. This thread cutter may, for example, be of the type illustrated in detail in the aforementioned U.S. Pat. No. 3,418,954. Briefly, it may be noted that this type of thread cutter employs a stationary blade 33, which is of generally hook-shaped configuration, and a pivoted cutter blade 35 which cooperates with the fixed blade 37. The pivoted blade 35 is electrically operated, e.g., by means of a solenoid (not shown), to sever threads drawn from the sewing machine by a piece of material after it has been sewn.

Figure 3:
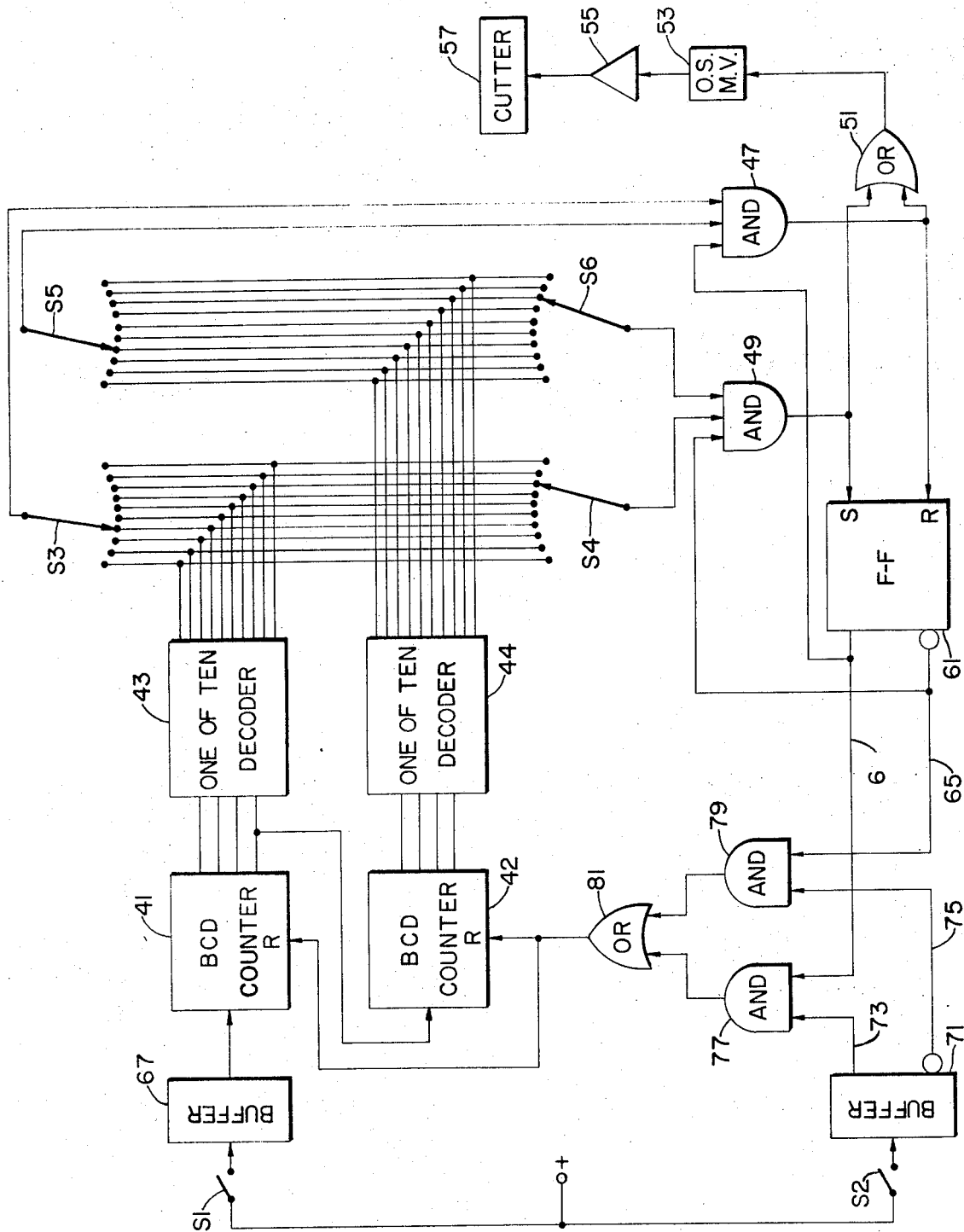
FIG. 3 is a schematic logic diagram of control apparatus according to the present invention.

Referring now to FIG. 3, which is drawn in substantially conventional digital logic format, the control apparatus illustrated there employs a pair of decimal counting stages 41 and 42. The counting stages 41 and 42 may, for example, be of the so-called binary-coded-decimal (BCD) type and may comprise one or more semiconductor integrated circuits (IC's) appropriately interconnected. As is understood, such counting stages typically employ four binaries or flip-flops interconnected so that the overall circuit has ten distinct states which occur sequentially as pulse signals to be counted are applied to the counting stage.

Each counting stage includes read out means providing four output signals which define the particular state of the counter at any given time. As is also conventional, the counting stages 41 and 42 are arranged so that they may be cleared or reset at will by means of a signal applied to a reset terminal, indicated at R on each counting stage. The predetermined state to which each counter is reset upon applying the clear or reset signal is conveniently assumed to be zero count although other states could also be used. The most significant output signal from the first counting stage 41 is applied as the input signal to the second counting stage 42 so that the first functions essentially as a units counter while the second functions as a tens counter.

The four output signals provided by each of the counters 41 and 42 are applied to a respective one-out-of-10 decoder, 43 or 44. Each decoder operates to provide ten output signals, one for each state of the respective BCD counting stage. Thus, each signal indicates a "high" or binary "one" only when the counter is in the respective state. As may be seen, each BCD counting stage together with the respective one-out-of-10 decoder forms a decimal counter with a respective signal for each state.

The 10 decoder signals provided by the units counting stage 43 are applied to respective fixed terminals of each of a pair of units selection switches S3 and S4. Each of the switches S3 and S4 comprises a separate, manually operable, single-pole, 10-position switch. Similarly, the 10 decoded signals provided by the tens counting stage 42 are provided to the fixed terminals of a similar pair of tens selection switches S5 and S6. Switches S5 and S6 are also manually operable, single-pole, 10-position switches. As illustrated, the units selection switch S3 is associated with the tens selection switch S5 so as to together constitute a first count selector while the units selection switch S4 is similarly associated with the tens selection switch S6 to constitute a second count selector. As will be understood, each pair of count or state selection switches can thus define a particular state of the two stage decimal counter between 0 and 99.

As will be apparent hereinafter, the switches S4 and S6 preselect a count which corresponds to the leading edge of a piece of material passing under the presser foot while the switches S3 and S5 preselect a count which corresponds to the trailing edge. The signals picked off by the switches S3 and S5 are combined in an AND gate 47 so that an output signal can be provided from the AND gate only when the state of the two stage counter coincides with the state preselected by the manual setting of the switches S3 and S5. As is explained hereinafter, the generation of an output signal from AND gate 47 is further conditioned upon the presence of a third input signal applied to the gate. In similar fashion, the signals picked off by the selection switches S4 and S6 are combined in an AND gate 49 so that an output signal can be provided from gate 49 only when the state of the two stage counter coincides with the state selected by the setting of those two switches. The generating of this output signal is also conditioned by a third input to gate 49, obtained as described hereinafter.

The output signals from the AND gates 47 and 49 are applied as input signals to an OR gate 51 so that either can trigger a one-shot multivibrator circuit 53. When triggered, the one-shot multivibrator 53 operates to generate a single pulse having a preselected duration. This pulse, after being amplified as indicated at 55, is applied to operate the thread cutter, e.g., by means of its control-solenoid, as indicated at 57.

The outer signals from the AND gates 47 and 49 are also applied, respectively, to the set and reset input terminals of a flip-flop circuit 61. Flip-flop circuit 61 is a bistable device having two distinct stable states, designated the set state and the reset state. Each of these states is stable, that is, once the device is put in its set state by a signal applied to the set input terminal, it will remain in the set state until a signal is applied to the reset input terminal, even though the original set signal is merely a pulse and does not continue over this interval. As is understood, this function may also be provided by a latching relay.

Flip-flop circuit 61 provides two output signals, a first signal, provided on a lead 63, which is a "one" or is "high" when the flip-flop is in its set state and a second signal, on a lead 65, which is "high" when the flip-flop 61 is in its reset state. The set output signal is applied as the third input to the AND 47 while its complement, the reset signal, is applied as the third input to the AND gate 49.

Since the signals supplied to the AND gates 47 and 49 by the flip-flop 61 are complementary, only one of these AND gates is enabled at any one time. In other words, only the AND gate 47 can generate an output signal when the flip-flop 61 is in its set state and only the AND gate 49 can generate an output signal when the flip-flop 61 is in its reset state. It can further be seen that the generation of such an output signal by either AND gate will immediately cause the flip-flop 61 to reverse state. Thus, once one of the AND gates generates an output signal, it is immediately disabled and the other AND gate is enabled. As noted previously, the generation of either output signal is further conditional upon the coincidence between the state of the two-stage decimal counter and the state of the respective pair of selection switches.

The signal counted by the two stage decimal counter is that generated initially by the tachometer switch S1. A signal generated by switch S1 is applied to the input terminal of the units counter 41 through a buffer circuit 67 which shapes the waveform of the switch signal to obtain a sharply defined square-wave signal suitable for driving semiconductor counter circuits, as is understood by those skilled in the art. As the switch S1 is driven in sychronism with the operation of the sewing machine, it will thus be seen that the counter will be advanced at a rate which corresponds to the speed of operation of the sewing machine. In other words, the count held by the two stage decimal counter will be proportional to the number of stitches taken by the machine since the counter was reset.

The signal provided by the material sensing switch S2 is likewise applied to a buffer circuit 71 to obtain a waveform suitable for use in conjunction with semiconductor switching circuits. In addition to providing, on an output lead 73, a first signal which is merely buffered, buffer circuit 71 also provides, on an output lead 75, a signal which is the inverse or complement of that on output lead 73.

The signals provided on the leads 63 and 73, by the flip-flop 61 and the buffer 71, respectively, are combined in an AND gate 77 while the signals provided on the leads 65 and 75 are similarly combined in an AND gate 79. The output signal from the AND gates 77 and 79 are then further combined in an OR gate 81, the output signal from the OR gate being applied to the reset terminals of the BCD counting stages 41 and 42. Accordingly, it can be seen that the reset signal is generated when the flip-flop circuit 61 is in its set state and material is present, the switch S2 being closed, and is also generated when the flip-flop is in its reset state and material is not present. When the reset signal is applied, the counting stages 41 and 42 are held in their reset states so that the count or state of the counter will not be advanced even though impulses are applied thereto by switch S1.

The operation of this apparatus is essentially as follows, it being initially assumed that the flip-flop 61 is in its reset state. When a piece of material is started under the presser foot 25, the switch S2 is closed. The signal thereby withdrawn from lead 75 causes the reset signal to likewise be withdrawn and thus the two-stage decimal counter is released from its reset state. This counter will therefore begin to accumulate a count which is proportional to the number of stitches taken by the sewing machine. When this count reaches the level corresponding to the preset state of the switches S4 and S6, an output signal will be generated from the AND gate 49. This output signal, operating through the OR gate 51, one-shot multivibrator 53 and amplifier 55, causes the cutter 57 to be actuated thereby severing threads at the leading edge of the material being sewn. Assuming that the switches S3 and S5 have been set at a value corresponding to the physical separation between the point of operation of the sewing machine needle 21 and the thread cutter 31, the cut produced will be closely adjacent the leading edge of the piece of material currently passing under the presser foot.

The output signal from AND gate 49 likewise returns the flip-flop 61 to its "set" state. The signals then present on leads 63 and 73 will therefore cause a reset signal again to be applied to the counting stages 41, resetting them to their initial or zero state and inhibiting further counting.

The counter is inhibited from counting until the trailing edge of the material being sewn releases the switch S2. At this point, the signal withdrawn from lead 73 will cause the reset signal to also be withdrawn so that the counter will again begin to accumulate a count at a rate proportional to the speed of the sewing machine. When this count reaches the level preselected by the setting of the switches S3 and S5, an output signal will be generated through the AND gate 47. This signal will likewise cause the operation of the cutter 57. Since the selection switches S4 and S6 can be set independently of switches S3 and S5, it can be seen that the amount of thread which is paid out of the sewing machine can be adjusted so as to correspond exactly with the separation between the needle and the thread cutter even though the paying out of the thread proceeds at a different rate than the advancement of the material itself.

In addition to triggering the operation of the cutter, the output signal from the AND gate 47 returns the flip-flop circuit 61 to the state initially assumed, that is, the reset state. Since the switch S2 has likewise been returned to its initial state at this time, the reset signal is again applied to the counting stages 41 and 42 to reset them to their zero state and to inhibit further counting until a subsequent piece of material is introduced into the machine.

Figure 4:
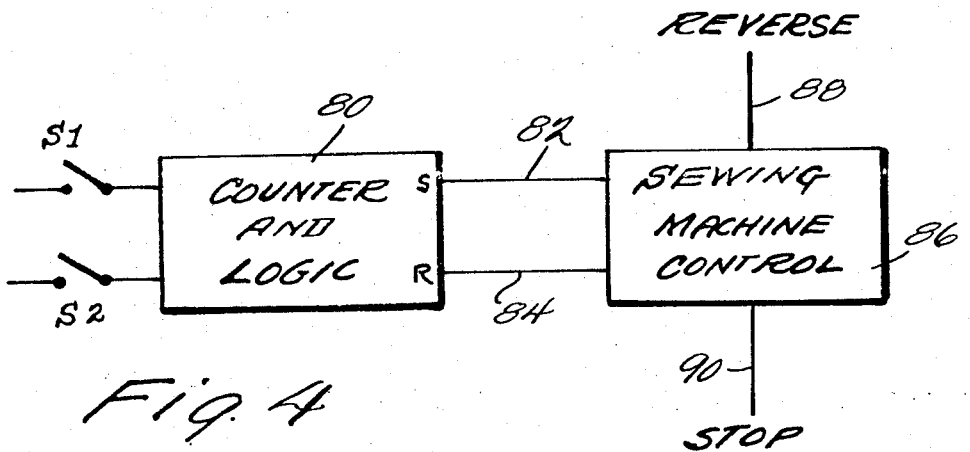
FIG. 4 shows a schematic view of the counting combination of FIG. 3 controlling reversal and stopping of the sewing machine.

It will, of course, be understood that the counting combination of FIG. 3 can be used for controlling any of a number of other machine operations. For example, in FIG. 4 the counter and logic of FIG. 3 is labeled 80 and includes buffer 67, counters 41 and 42, decoders 43 and 44, switches S3, S4, S5 and S6, AND gates 47 and 49 and flip-flop 61. Counter and logic 90 provides an output signal on line 82 on a first count and an output signal on line 84 upon a second count. Control 86 provides a suitable signal on line 88 to cause the sewing machine to be reversed upon the first count and thereafter another signal on line 90 to cause the sewing machine to stop upon the second count.

Figure 5:
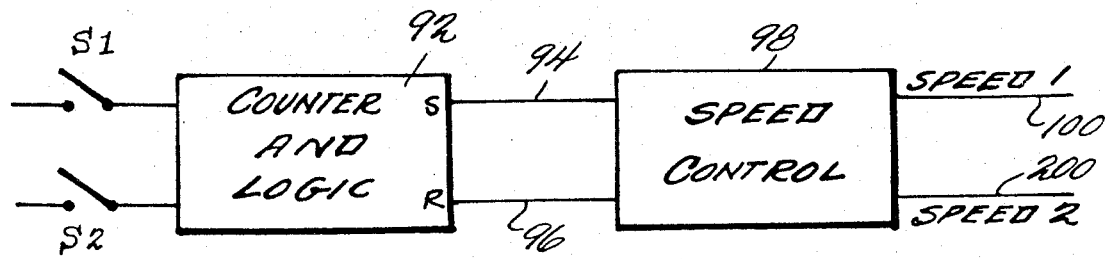
FIG. 5 shows a schematic view of the counting combination of FIG. 3 controlling the speed of the sewing machine.

Fig. 5 shows a further embodiment in which counter and logic 90 provides an output signal on line 94 upon a first count and an output signal on line 96 upon a second count. Control 98 causes the machine to shift from a first machine speed to a second speed upon the first count so as to change the separation between stitches and then back to the first speed upon the second count.

While the various control system components have been illustrated and described as semiconductor or integrated circuit logic components, it should be understood that these logic functions may also be provided by electromechanical equivalents. For example, in one satisfactory construction of apparatus according to the invention, the one-out-of-10 decoding was provided by a matrix of reed relays and the AND and OR gate functions were provided by appropriate relay contacts, the relays being operated in cooperation with integrated circuit BCD counting units. The use of such electromechanical elements in conjunction with certain of the manually and mechanically operated switching components may be useful, in some environments, to alleviate the sensitivity of some semi-conductor digital components to various electrical transients which may be present.

In view of the foregoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

What is claimed is:

1. Apparatus for operating a thread cutter associated with a sewing machine a predetermined distance from the point of operation of the sewing machine needle, said apparatus comprising:
   signal generating means operable in synchronism with said sewing machine for providing an impulse signal having a frequency which is proportional to the speed of operation of said sewing machine,
   a digital counter for counting impulses provided by said signal generating means, said counter having a multiplicity of distinct states which occur sequentially and having also read out means providing signals identifying the state of the counter,
   means for providing a signal substantially when the edge of a piece of material being sewn passes the point of operation of the sewing machine needle and for applying that signal to reset said counter to a predetermined state,
   a presettable control switch having a multiplicity of states corresponding to possible states of said counter, said switch and said counter being interconnected to provide an out-put signal when coincidence occurs between the state of said counter and a preset state of said switch, and
   means for actuating said cutter in response to said output signal.

2. Apparatus as set forth in claim 1 wherein said signal providing means indicates a first state when material is present and indicates a second state when material is absent and wherein said counter is reset when said signal providing means changes from either state to the other.

3. Apparatus as set forth in claim 1 further comprising a second presettable control switch having a multiplicity of states corresponding to possible states of said counter and being interconnected with said counter to provide a second output signal when coincidence occurs between the state of said counter and a preset state of said switch and means controlled by said signal providing means for applying said second control signal to said cutter actuating means in place of the first said output signal.

4. Apparatus as set forth in claim 3 including means for stopping said counter after said cutter is actuated until a material edge again passes the point of needle operation.

5. Apparatus for operating a thread cutter associated with a sewing machine a predetermined distance from the point of operation of the sewing machine needle, said apparatus comprising:
   signal generating means operable in synchronism with said sewing machine for providing an impulse signal having a frequency which is proportional to the speed of operation of said sewing machine,
   a digital counter for counting impulses provided by said signal generating means, said counter having a multiplicity of distinct states which occur sequentially and having also read out means providing signals identifying the state of the counter,
   means for resetting said counter to a predetermined state substantially when the edge of a piece of material being sewn passes the point of operation of the sewing machine needle, and
   means for actuating said cutter when said counter reaches a preselectable state.

6. Apparatus for operating a thread cutter associated with a sewing machine a predetermined distance from the point of operation of the sewing machine needle, said apparatus comprising:
   signal generating means operable in synchronism with said sewing machine for providing an impulse signal having a frequency which is proportional to the speed of operation of said sewing machine,
   a digital counter for counting impulses provided by said signal generating means, said counter providing a multiplicity of distinct states which occur sequentially and having read out means providing signals identifying the state of the counter, said counter having also reset means for setting said counter to a predetermined state in response to a reset signal applied thereto,
   sensing means for detecting when the edge of a piece of material is present at the point of operation of the sewing machine needle,
   a first presettable control switch having a multiplicity of states corresponding to possible states of said counter, said first control switch and said counter being interconnected to provide a first output signal when coincidence occurs between the state of said counter and a preset state of said first control switch, a second presettable control switch having a multiplicity of states corresponding to possible states of said counter, said second control switch and said counter being interconnected to provide a second output signal when coincidence occurs between the state of said counter and a preset state of said second control switch, a bistable device, said first output signal being applied to set said device to a first stable state, said second output signal being applied to set said device to a second stable state, means interconnected with said sensing means for applying a reset signal to said counter when said bistable device is in said first stable state and material is present or when said bistable device is in said second stable state and material is absent, and means responsive to said first output signal when said bistable means is in said second state and responsive to said second output signal when said bistable means is in said first state for actuating said cutter.

7. Apparatus as set forth in claim 6 wherein said counter comprises a semiconductor integrated circuit.

8. Apparatus as set forth in claim 6 wherein said counter comprises a pair of binary coded decimal counting units and a one-out-of-10 decoder for each unit and wherein each of said presettable control switches comprises a pair of manually operable, 10-position switches.

* * * * *